United States Patent [19]

McBrien

[11] Patent Number: 5,075,545
[45] Date of Patent: Dec. 24, 1991

[54] OPTICAL MEASUREMENT OF THE POSITION OF AN OBJECT

[75] Inventor: Gregory J. McBrien, Cromwell, Conn.

[73] Assignee: United Technologies Corporation, Hartford, Conn.

[21] Appl. No.: 262,848

[22] Filed: Oct. 26, 1988

[51] Int. Cl.$^5$ .............................................. H01J 5/16
[52] U.S. Cl. ................................ 250/227.21; 356/352
[58] Field of Search ............... 250/227, 231 R, 227.21, 250/227.27; 356/4.5, 5, 352, 355–358; 350/96.15; 367/149; 73/862.59

[56] References Cited

U.S. PATENT DOCUMENTS

| | | | |
|---|---|---|---|
| 3,238,839 | 3/1966 | Day, Jr. | 356/355 |
| 3,409,370 | 11/1968 | King et al. | 356/5 |
| 3,611,277 | 10/1971 | Yoder | 356/5 |
| 3,679,313 | 7/1972 | Rosenberg | 356/352 |
| 3,733,129 | 5/1973 | Bridges | 356/5 |
| 3,788,743 | 1/1974 | George | 356/352 |
| 4,269,506 | 5/1981 | Johnson et al. | 356/5 |
| 4,309,109 | 1/1982 | Blodgett et al. | 356/356 |
| 4,422,167 | 12/1983 | Shajenko | 367/149 |
| 4,443,107 | 4/1984 | Alexander et al. | 356/358 |
| 4,500,979 | 2/1985 | Scott | 367/149 |
| 4,604,898 | 8/1986 | Gohin et al. | 33/138 |
| 4,713,540 | 12/1987 | Gilby et al. | 250/227.21 |
| 4,738,527 | 4/1988 | McBrien | 356/5 |
| 4,897,541 | 1/1990 | Phillips | 250/227.21 |
| 4,972,076 | 11/1990 | Willson | 250/227.21 |

Primary Examiner—David C. Nelms
Assistant Examiner—S. Allen
Attorney, Agent, or Firm—Francis J. Maguire, Jr.

[57] ABSTRACT

The invention teaches determining position with light by providing amplitude modulated input light at an input light port of an optical cavity having a variable length dimension, detecting light at an output light port of the optical cavity and varying the frequency of amplitude modulation until a peak is detected. The maximizing frequency can then be related to the length of the cavity. The cavity may comprise an optical fiber inserted into a variable length cavity filled with a liquid having an index of refraction which matches that of the fiber. Mirrors may be placed at either end of the cavity.

6 Claims, 6 Drawing Sheets

OPTICAL MEASUREMENT OF THE POSITION OF AN OBJECT

TECHNICAL FIELD

This invention relates to position transducers using light as a measure and, in particular, relates to the measurement of linear position using an optical cavity having a variable length dimension.

BACKGROUND ART

Position sensors employing light as a measure offer a passive, nonconductive solution to the electromagnetic interference and space problems in aircraft and other control systems that require lightweight, interference tolerant sensors. Presently, these systems have undesirable aspects of high cost and complexity.

Several position sensing systems employing optical fiber based, electrically passive methods have been developed. Perhaps the most mature design is the one employing digitally encoded face plates to impress a binary pattern of light into a fiber signal channel. This method requires parallel fibers for each binary channel. To achieve the desired resolution and range, many fibers must be used. These have the advantage of being inherently digital and therefore noise immune without suffering performance degradation. Other methods involve amplitude encoding of one or more channels, which produce problems where connector or link variations occur. Still other methods include time domain and wavelength multiplexing. See U.S. Pat. No. 4,546,466 for an example of an optical encoder.

What is needed is a different sensing method with simplified optical hardware and where loss variations in the channel do not have a primary impact on system performance.

DISCLOSURE OF THE INVENTION

The object of the present invention is to provide an apparatus and method for sensing position with light using extremely simple optical hardware.

According to the present invention, amplitude modulated input light is provided at an input light port of an optical cavity having a variable length dimension. The input light which has traversed the variable length dimension is reflected within the cavity so as to set up interference between incoming light and reflected light. The interference is detected at an output light port of the optical cavity. The present length of the variable length dimension is determined by changing the modulation frequency until a resonance is detected. The wavelength of the modulation is then related to the length of the cavity.

An apparatus for carrying out the present invention may comprise an optical fiber having an input port inserted into a variable length optical cavity filled with a fluid which matches the index of refraction of the optical fiber. The optical fiber may also have an output port positioned in such a manner as to receive reflected input light. A moveable mirror may be employed at one end of the cavity's variable length dimension and a second mirror at the other end for reflecting the input light between the mirrors. The light provided may be amplitude modulated input light, i.e., having a time-varying intensity with a frequency of modulation which may be changed. One of the principles upon which this embodiment of the invention is predicated is that the frequency corresponding to the maximum detected intensity will have a wavelength which is a multiple of the distance between the mirrors. In other words, the reflecting waves will interfere constructively and oscillations will be sustained, thereby maximizing the detected intensity. The length between the mirrors can thereby be inferred using the wavelength of the maximizing amplitude modulating frequency as a measure.

In further accord with the present invention, such an apparatus may further comprise means for automatically changing the frequency of the input light time-varying intensity (i.e., the frequency of amplitude modulation) in order to determine the frequency at which the detected intensity of the output light is maximum. This may be accomplished in such an apparatus by providing means for detecting the average intensity of the input light as the frequency is changed over a range of frequencies.

In still further accord with the present invention, the modulation frequency of the intensity modulated light may be increased and decreased, or "dithered" over a relatively narrow frequency modulation range above and below the present modulating frequency in order to produce, by virtue of the present frequency transfer characteristic of the variable length cavity, amplitude modulation in the amplitude modulated reflected light which is indicative of the difference between the present operating frequency of intensity modulation and the frequency at which the detected intensity of the output light is maximum. The cavity will have a different frequency transfer characteristic for each of the possible lengths which it may assume. The amplitude modulated envelope of the amplitude modulated reflected input light is detected and provided as a zero-averaged envelope signal to a synchronous demodulator which demodulates the envelope signal with respect to a signal indicative of the "dither" frequency. The demodulator provides an error signal indicative of the difference between the maximizing frequency of amplitude modulation and the present modulation frequency. The error signal is integrated to provide a modulation frequency command signal for commanding a present frequency at the maximizing frequency. By commanding the maximizing frequency, the error signal is zeroed.

In still further accord with the present invention, input light is provided at an input light port of an optical cavity comprising an optical fiber delay line having an index of refraction matched to the index of refraction of a fluid in a tube in which said delay line is inserted. This permits light to be propagated across the interface between the delay line and the fluid as if the interface were transparent. The fiber delay line has a mirrored surface at the input light port end and the tube has a moveable mirror at an end opposite from which the delay line is inserted for reflecting the input light back to the mirrored surface end of the delay line in which there is also located the output port. Movement of the moveable mirror changes the length of the cavity.

In still further accord with the present invention, input light is provided from a light source along an optical fiber to the input light port and output light is provided from said output light port along an optical fiber to a detector.

The present invention provides a simple optical method and apparatus which makes use of a new position sensing approach which comprises measuring a variable length with amplitude modulated light which need not be coherent, which may be of any color and which may even be simply "white" light. An elaboration of the disclosed method and apparatus comprises developing a frequency corresponding to length changes in a passive optical resonant cavity. The invention has the advantage of simple electronic control as well as extremely simple optical hardware. The invention uses an optical fiber to create a relatively long optical cavity (compared to the physical size of the liquid-filled cavity, the effective optical length of the "cavity" is indeed quite large) and permits the use of relatively low frequency modulation for use not previously thought of in the art of position measuring. And since in a resonant cavity the information is encoded in frequency, loss variations in the channel do not have a primary impact on system performance.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
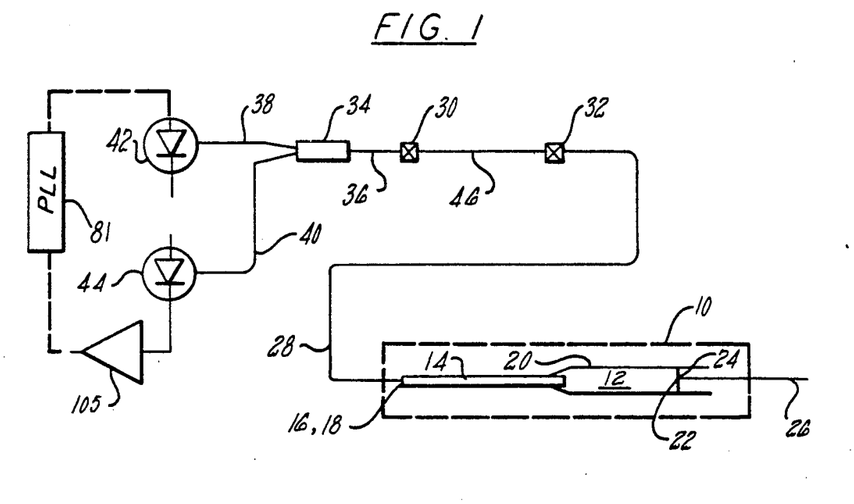
FIG. 1. is a simplified illustration of an apparatus for determining position with light, according to the present invention.

FIG. 1 is an illustration of a position sensor 10 with an optical cavity 12, 14 and a combined input/output port 16, 18. The cavity 12, 14 comprises an optical fiber delay line 14 having a mirrored surface at the input/output end and having an index of refraction which is matched by a fluid contained in the cavity 12 which may be the hollow of a long cylindrical tube 20. A mirrored surface 22 in the form of a moveable disk 24 seals the other end of the cavity 12. A rod or piston 26 is attached to the object whose position is to be measured.

Figure 2:
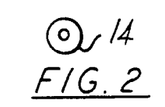
FIG. 2 is an end view of the optical delay line of FIG. 3 as viewed from the input/output port end of the delay line.

FIG. 2 shows the end of the optical delay line 14 as viewed from the input/output end. A small circular portion of the mirrored surface is etched away and an optical fiber 28 is butted up and heated to melt onto and bond to the delay line. Alternatively, the optical fiber 28 may be adhesively bonded with optical adhesive to the delay line. The optical fiber 28 serves as both the input and output line from the sensor, in this particular embodiment. A number of connectors 30, 32 will normally be required in aircraft applications and are shown close to an optical coupler or combiner-splitter 34 which splits an optical fiber 36 into two branches 38, 40.

In the embodiment of FIG. 1 a light source 42 provides light which propagates along fiber 38 until it reaches the coupler 34. Most of the light entering the coupler is propagated through the coupler onto the optical fiber 36. However, a small portion is reflected back to the source 42 on fiber 38 and also back to a detector 44 on fiber 40.

Once the light reaches the input port 16, it enters the optical delay line 14 portion of the variable length cavity. The light propagates down the delay line until the end of the delay line is reached. Since the fluid in the cavity 12 has the same, or nearly the same, index of refraction as the optical delay line 14, the interface is transparent and the light will propagate across the boundary without reflection. It will continue to propagate across the cavity 12 until it reaches the mirrored surface 22 at which point it is reflected back across the cavity 12, across the boundary between the cavity 12 and the delay line 14, through the delay line 14 to the output light port 18. At this point a portion of the reflected light will exit the sensor 10 and propagate back to the detector 44 along fiber-optic lines 28, 46, 36, 40. The light will be picked up by detector 44.

Figure 5:
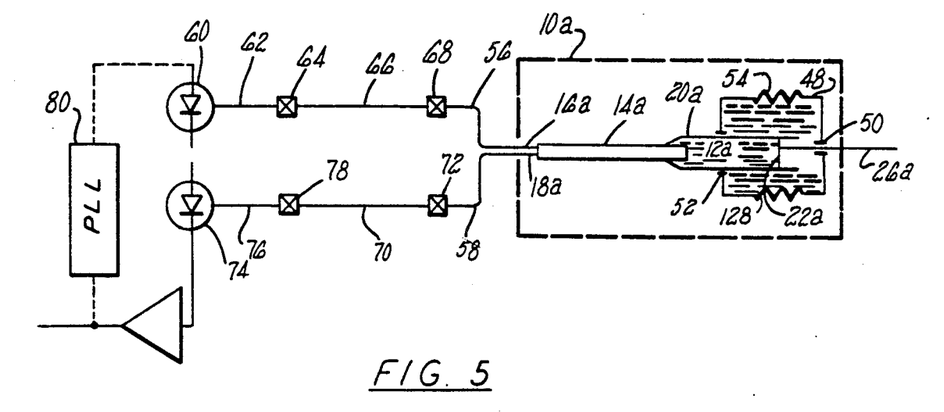
FIG. 5 is an illustration of an apparatus for determining position with light, according to the present invention.

FIG. 5 is another embodiment 10a of the apparatus of the present invention. An optical cavity having a variable length dimension comprises an optical delay line 14a inserted into a hollow tube 20a having a cavity 12a filled with a liquid having an index of refraction matched to that of the delay line 14a. A mirrored disk 22a is held in a moveable position much like a piston in a cylinder by a rod 26a which is attached to an object whose position is to be measured.

Figure 3:
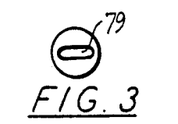
FIG. 3 is an end view of the input/output end of an optical delay line similar to that of FIG. 6 or 7.
Figure 4:
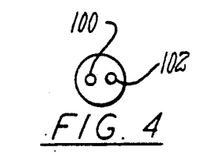
FIG. 4 is an end view of the input/output end of an optical delay line similar to that of FIG. 6 or 7.

The sensor 10a of FIG. 5 includes a flexible bladder 124 capable of either expanding or contracting to accept more or less fluid from the cavity 12a depending on the position of the disk 22a. Liquid from the cavity flows past the edges of the disk into the bladder which is sealed around the piston rod 26a by seals 50 and around the tube 20a by seals 52. The flexible nature of the bladder is indicated by accordion-like symbols 54. In fact, if a bladder is not used, these may be metallic accordion-like devices which serve a function similar to that of a bladder. It should be noted that the variable length dimension aspect of the cavities 12, 12a of FIGS. 1 & 5 may be accomplished in any of a wide variety of different ways. An external bladder is provided to permit fluid to enter and exit the cavity with movement of the piston. The sensor 10a of FIG. 5 is shown having a separate input port 16a and a separate output port 18a, each associated with separate optical fibers 56, 58. An input light source 60 provides input light on a fiber 62 to a connector 64 and onto a fiber 66 for connection to fiber 56 at a connector 68. Output fiber 58 connects to a fiber 70 by means of a connector 72. A detector 74 is connected to fiber 70 by means of an optical fiber 76 and a connector 78. The separate input/output ports 16a, 18a may comprise separate portions of an aperture 79 etched from the end of the optical delay line 14a as shown in FIG. 3. Of course, many variations of such apertures are possible (such as those shown in FIG. 4, to be discussed subsequently in connection with FIG. 6). Each of the optical fibers 56, 58 may be butted up and heated to flow so as to melt onto the delay line 14a. As in the embodiment of FIG. 1, they may also be adhesively bonded with optical adhesive.

The sensor 10a of FIG. 5 may be used in a tuned cavity application. If the cavity 12a is thought of as having a length "a" (which is variable) and the delay line is thought of as having a length "b" (which is fixed), the total length of the cavity is (a +b) and the intensity of the light admitted into the cavity can be modulated at a frequency having a wavelength ($\lambda$) satisfying the equation $\lambda = 2(a+b)/n$, where n is a whole number, which results in constructive interference of the intensity (amplitude) modulation of the reflected lightwaves. A phase locked loop 80 may be used to modulate the input light intensity in a continuous wave fashion. (A similar PLL 81 may be used as shown in FIG. 1). The frequency of modulation is varied to find a resonance. The resonant wavelength is equal to $2(a+b)/n$, where n is a whole number, and proportional to the input position of the object to be measured.

Figure 6:
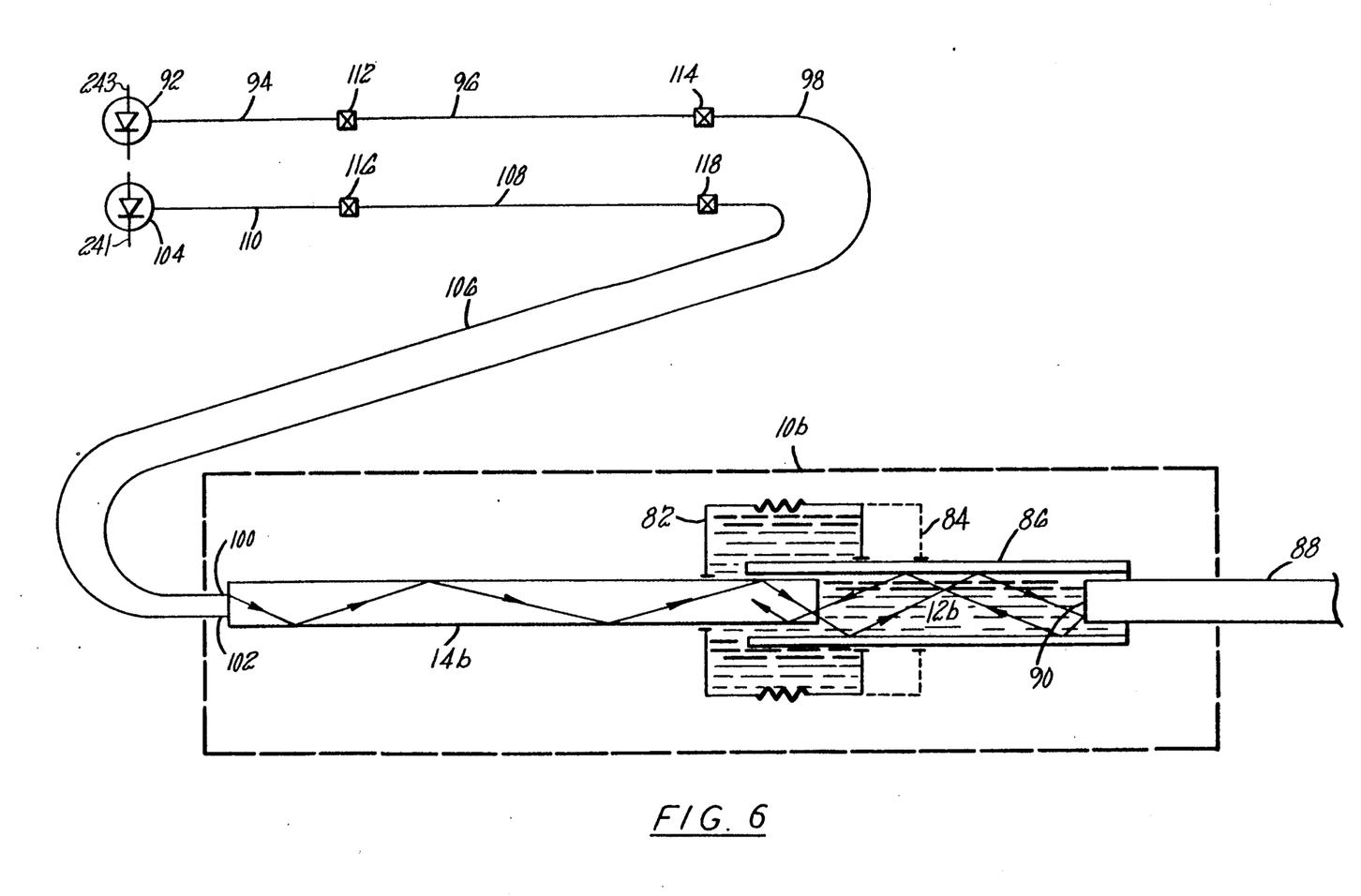
FIG. 6 is an illustration of an apparatus for determining position with light, according to the present invention.

FIG. 6 is an illustration of an embodiment 10b of the apparatus of the present invention. It is very similar to the embodiment 10a shown in FIG. 5 except that a bladder 82 is located at the delay line end rather than the piston end, as in FIG. 5. The bladder 82 is shown having a present position shown in solid lines and a continuously expandable position indicated generally by dashed lines 84. This is intended to be suggestive of the continuous expansion capabilities of the bladder in schematic fashion. The actual mechanical details of the bladder, seals, etc., are not shown in detail, as expandable bladders are known, and merely need to be adapted for the present application to permit a cavity 12b in a tube 86 to be always filled with fluid regardless of the position of the sensor input shaft. The fluid may flow between the inner tube 86 walls and the outer walls of an optical delay line 14b or, as in FIG. 5, between the edges of the piston disk 22a and the inner tube walls.

Referring back to FIG. 6, a piston 88 having a mirrored surface 90 is inserted in one end of tube 86 and is moveable therein, depending upon the position of an object whose position is to be measured and which is attached to piston 88 (not shown).

A light source 92 provides input light along optical fibers 94, 96, 98 to an input port 100 at one end of the optical delay line 14b. The optical delay line 14b may be nothing more than a larger optical fiber having the same optical properties as fiber 98 except being oversized so as to be able to provide an output port 102 for receiving reflected waves and transmitting them back to a detector 104 along optical fibers 106, 108, 110. Of course, as in FIGS. 1 and 5, optical fiber connectors 112, 114, 116, 118 will be required as necessary for a practical system in which the source 92, the detector 104, and the sensor 10b are purchased from different sources. Of course, if made by the same manufacturer, and a permanent connection were desired, the connectors would be unnecessary.

Referring back to FIG. 4, the end of the delay line 14b is shown as viewed from the left of FIG. 6. There, the input port 100 and the output port 102 are shown as circular portions etched into the mirrored surfaces end of the delay line 14b. Thus, the reflectivity of the mirrored surface at the left hand end of the delay line 14b of FIG. 6 will have a reflectivity of less than one. The reflectivity of the mirrored surface 90 of the piston 88 may be thought of as a nearly perfect one.

In the sensor 10b of FIG. 6, the constructive interference of a continuous wave input light beam modulated at a frequency having a wavelength which is a multiple of the length of the variable length cavity will produce sustained oscillations which may be detected as an intensity maximum by the detector 188.

A stylized ray diagram is shown in FIG. 6 showing an input wave bouncing off the internal walls of the optical delay line and also the internal walls of the tube until it bounces off the mirrored surface 90 and heads back to the output port 102. The wave shown in FIG. 6, if of the proper wavelength, will constructively interfere on both the course from the input port 100 to the mirrored surface 90 and back from the mirrored surface 90 to the output port 102. This will produce an intensity maximum at detector 104 and provide the necessary intelligence to infer the position of the object to be measured. Thus, if the length of the cavity is known, the length of the piston can be taken into account in inferring the position of the object.

Figure 7:
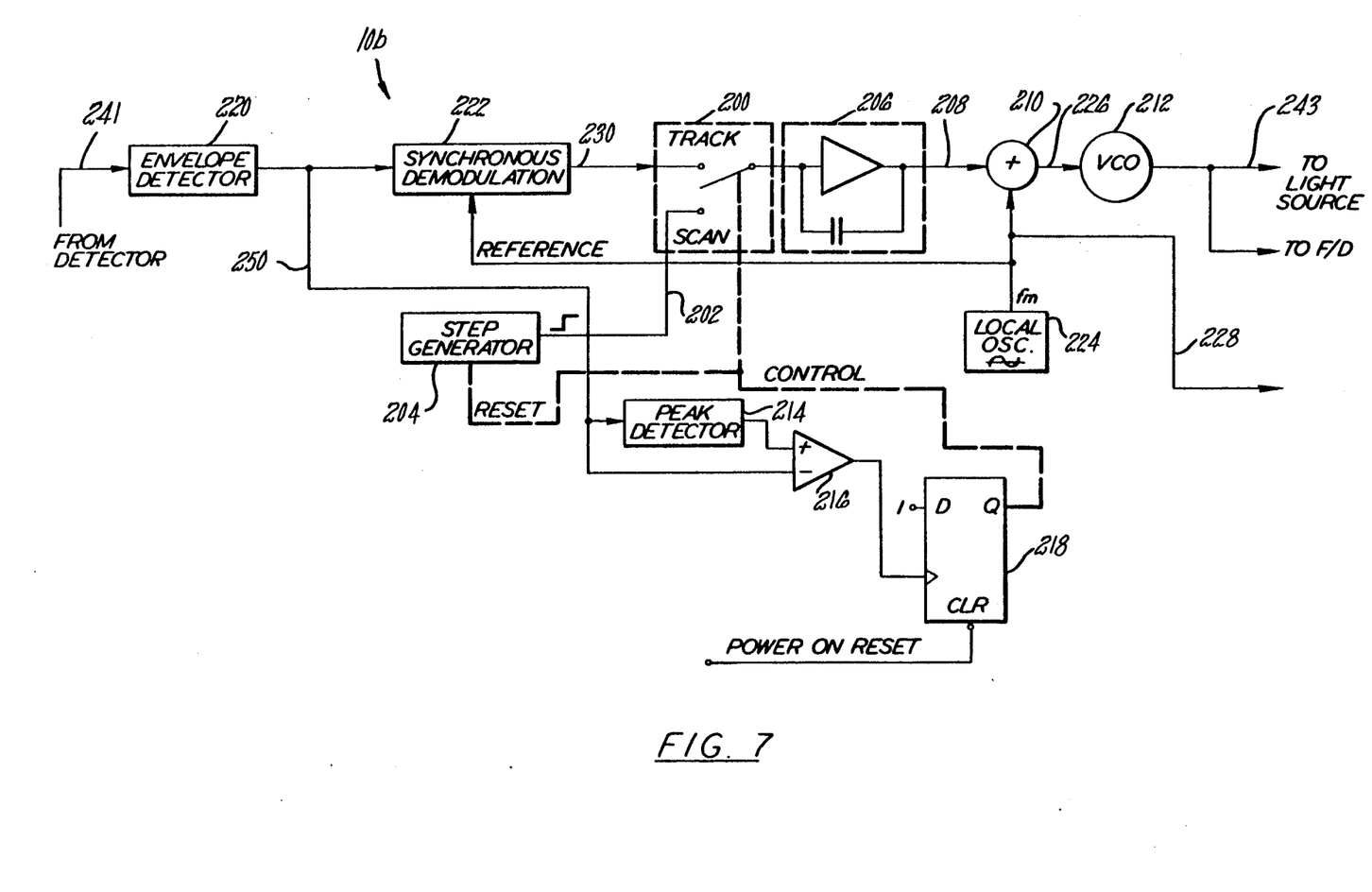
FIG. 7 is an illustration of a control circuit for providing closed loop control of the frequency input to an optical cavity having a variable length dimension.

Referring now to FIG. 7, a control circuit 106 is illustrated. It may be used in the device of FIG. 6 for continuous wave operation. It may be used for the control purpose of the PLLs of FIGS. 1 & 5.

If one were to attempt to find the frequency at which the output of the cavity 12b, 14b of FIG. 6 were maximized at the detector 104, by hand, one would introduce a number of different frequencies into the cavity using a variable frequency generator to modulate the intensity of the input light emanating from the source 92. Thus, one would vary the frequency continuously over a wide range looking for the particular frequency which maximizes the output. In so doing, one would first sweep across a relatively wide range of frequencies starting, perhaps, at a low frequency and steadily increasing frequency until an intensity maximum is encountered. At that point, a human operator would "dither" the frequency about a fairly narrow range in order to zero in on the exact frequency that gives the maximum output.

Figure 8:
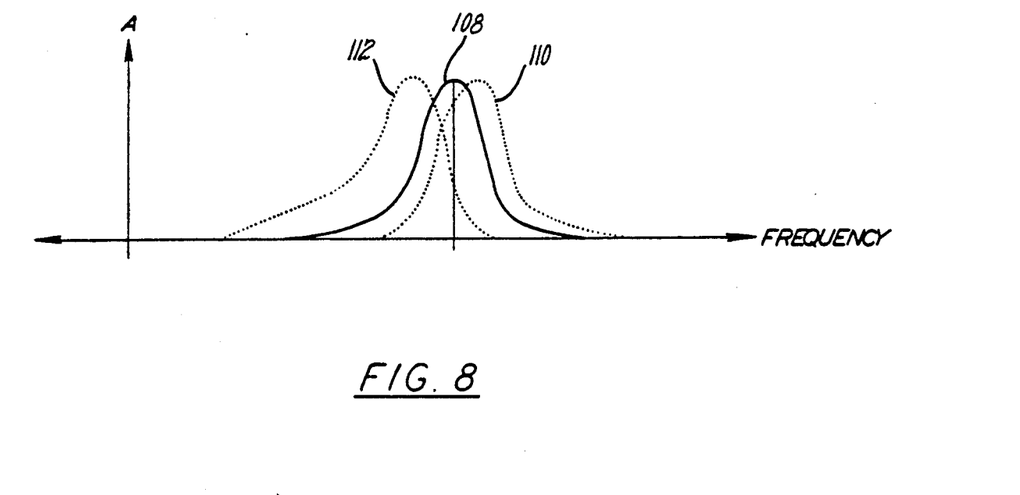
FIG. 8 is an illustration of a frequency transfer characteristic of an optical cavity having a variable length dimension.

Just that sort of process is carried out by the circuit shown in block diagram format in FIG. 7. The function of the circuit it to determine automatically the maximum of the transducer frequency response curve shown in FIG. 8. FIG. 8 is an illustration, of a frequency response curve 108 of a cavity at one of its many possible length dimensions. Another, higher frequency response 110 is shown for another length dimension. Similarly, yet another, lower frequency response 112 is shown for yet another length dimension of the cavity, in a direction opposite from that of the response 110. In other words, if the response 110 represents the response of the cavity for a length dimension shorter than that of the length it has when exhibiting the response 108, the response 112 corresponds to a cavity having a longer dimension than that of the response 108. The analogous manual operation would be to sweep an oscillator driving a resonator to find the peak response, on an oscilloscope trace. To find the peak automatically, a "dither" at frequency $f_m$ is used to generate an error proportional to the displacement of the present input frequency from the tank tuned center frequency, $f_c$.

In the start-up, or scan mode, a switch 200 selects a step input signal on a line 202 from a step generator 204 which is applied to an integrator 206, which in turn applies a signal on a line 208 through a summing junction 210 to a voltage controlled oscillator (VCO) 212 which "sweeps" the center frequency of the VCO over a range beginning at a relatively low level and increasing to the level reached by the integrator at the top of the step. This corresponds to the human operator taking the dial of his variable frequency source and, starting at a low frequency, gradually increasing frequency.

A peak detector 214 and a comparator 216 serve to find the approximate location of $f_c$, by holding the present value of the peak intensity and triggering the comparator when a fall off first occurs from a peak. This causes a flip-flop 218 to be triggered, switching the switch 200 and the circuit into the track mode. This corresponds to a human operator finding the approximate location of the peak and getting ready to zero in on the exact peak.

In the track mode, an envelope detector 220 provides the amplitude at any instantaneous frequency f, and a synchronous demodulation circuit 222 generates a signal which is non-zero when the VCO is not centered over the peak of the band pass. This error is integrated to drive the VCO eventually to the peak. This is done by means of a local oscillator 224 providing a superimposed "dither" signal on the output of the integrator by means of the summing junction. Thus, the integrated signal 208 provided to the VCO 212 has a dither signal superimposed on the integrated signal to provide a combined dithered integrated signal on a line 226 to the VCO. This corresponds to the human operator "dithering" the dial of his variable frequency generator to find the exact maximum intensity frequency. The VCO output is then provided to a frequency-to-digital (F/D) converter to the outside system, to be counted for generation of the transducer position data.

Figure 9:
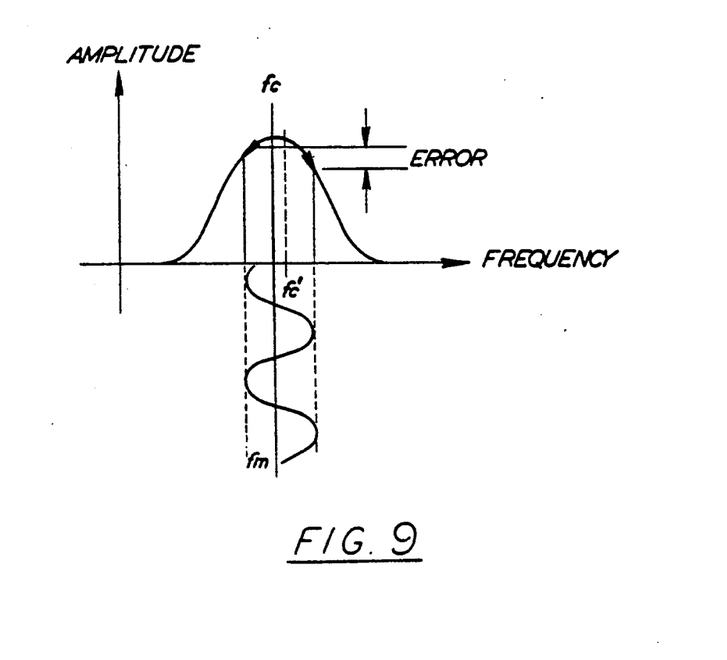
FIG. 9. is an illustration of a dynamically biased amplitude search such as would be accomplished by the circuit of FIG. 7.

FIG. 9 is an illustration of a modulating frequency $f_m$ from the local oscillator 224 of FIG. 7 corresponding to a signal on a line 228 provided to summing junction 210. The "dither" signal on line 228 is shown in FIG. 9 dithering the frequency of the input light in the cavity about a center frequency $f_c'$ which is separated from the actual tuned frequency of the cavity, $f_c$, as indicated by the magnitude of an error signal on a line 230 in FIG. 7 which is input to the integrator 206. Of course, the function of the control circuit of FIG. 7 is to zero this error and keep the light source zeroed in on this maximizing frequency so that the proper intelligence can be provided for determining the correct position of the transducer.

Figure 10:
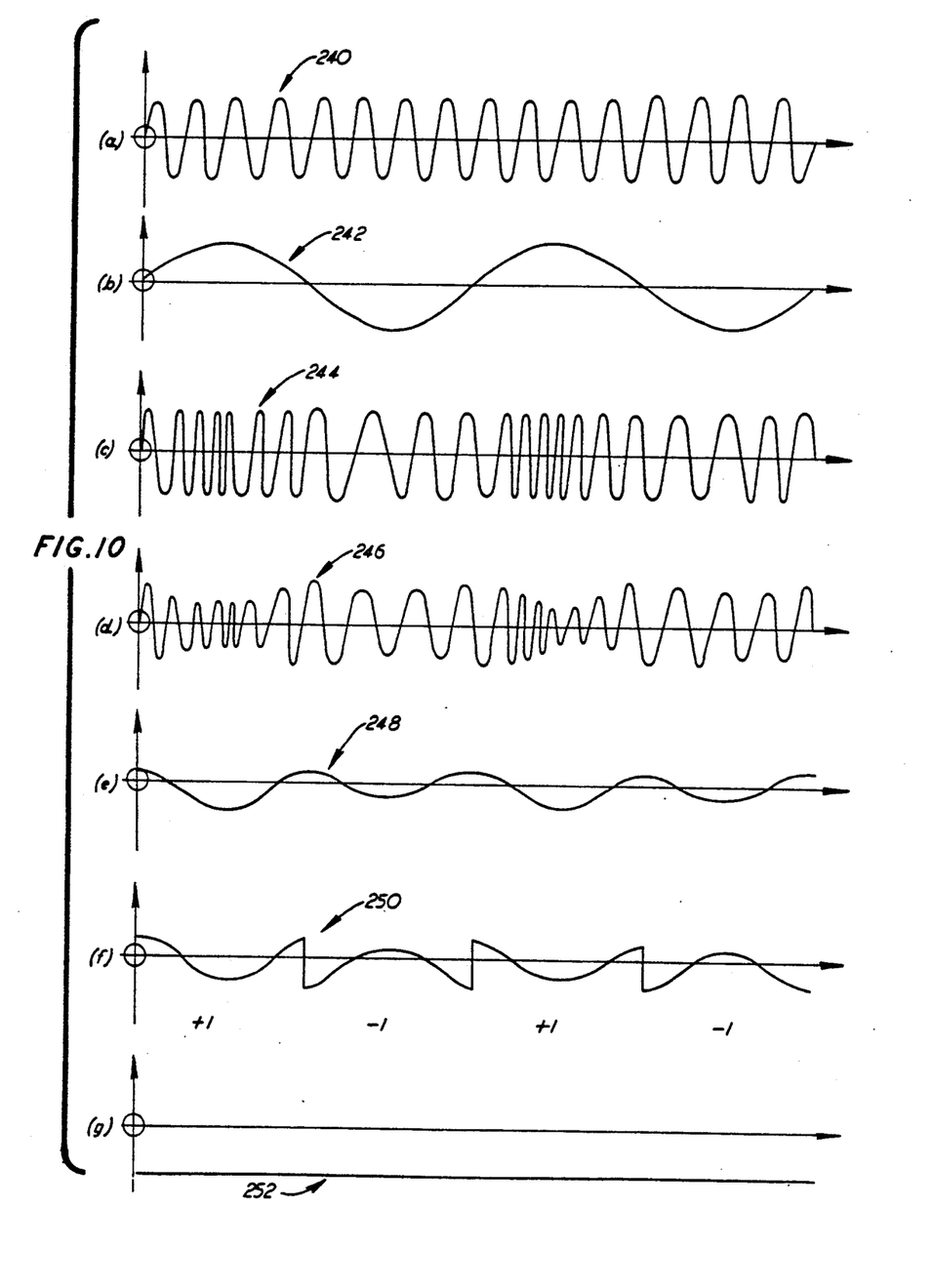
FIG. 10 is an illustration of several waveforms illustrating several of the signals present in the circuit of FIG. 8 for the case where the resonant frequency of the cavity has not yet been found by the circuitry.

FIG. 10 is an illustration of several waveforms of some of the signals of FIG. 7. FIG. 10(a) shows a waveform 240 indicative of the intensity of the light source 22 of FIG. 1 as would appear on a line 241 of FIG. 7 without "dithering." For a typical case, the frequency of intensity modulation would be on the order of 50 megahertz. Intensity modulation at about that frequency implies a wavelength of about 4 meters, in glass. Thus, if the tube 86 of FIG. 6 is on the order of several centimeters in length, the delay line 14b will necessarily be on the order of slightly less than 4 meters for an integral wavelength. It could, of course, be equal to a fractional wavelength long, as described above, for constructive interference.

A waveform 242 is illustrated in FIG. 10(b) and is indicative of the voltage which appears on line 228 of FIG. 7 except that its frequency has been drawn not to scale in order to help to convey some of the concepts presented herein. In actuality, the frequency signal on a line 243 from the local oscillator 212 of FIG. 7, which provides the dithering frequency, will be on the order of about a few kilohertz, e.g., 3 kilohertz which has a wavelength of 100,000 meters. Thus, it will be seen that the time lines of FIGS. 10(a) and (b) are not the same and that the time line of waveform 242 has been compressed by a factor of about 2,083, for teaching purposes only. Thus, it will be understood that the time lines presented in FIG. 10 do not necessarily correspond absolutely but have been juxtaposed using different time lines for teaching purposes. The summation of the fundamental modulation frequency, $f_c'$, and the "dither" frequency, $f_m$, produces a frequency modulated fundamental frequency illustrated in FIG. 10(c). If a 3 kilohertz dither frequency is used in conjunction with a 50 megahertz "carrier" the carrier will be dithered from 48 ½ megahertz to 51 ½ megahertz. It should be understood that the waveform 244 shown in FIG. 10(c) is not drawn to scale but does have approximately the same time line as that shown in FIG. 10(a). The waveform 244 corresponds to the signal on the line 226 of FIG. 7.

FIG. 10(d) illustrates a waveform 246 which has been amplitude modulated due to the frequency transfer characteristic of the optical cavity 12b, 14b of FIG. 7 at its present length. It is assumed, for purposes of FIG. 10, that the carrier frequency illustrated by waveform 240 in FIG. 10(a) does not correspond to the center frequency of the frequency transfer characteristic of the optical cavity at its present length. This will result in an error signal similar to that shown in FIG. 9.

FIG. 10e is an illustration of a waveform 248 corresponding to a signal on a line 250 in FIG. 7 from the envelope detector 220. The envelope detector detects the amplitude modulation produced by the "dither". In this particular case, the dither produces a second harmonic plus some first harmonic of the dither frequency which is zero-averaged in the envelope detector. A synchronous demodulator 222 compares the envelope to the dither frequency itself and provides a signal on a line 230 having a waveform 250 illustrated in FIG. 10(f). The synchronous demodulator can be thought of as a multiplier which senses the sign of the voltage on line 228 from the local oscillator and multiplies the voltage on line 250 (as evidenced by wave form 248 in FIG. 10(e)) by plus or minus one.

The synchronous demodulator also filters (not shown) the signal on line 230 to provide a filtered error signal on line 230 as illustrated by a waveform 252 in FIG. 10(g).

Figure 11:
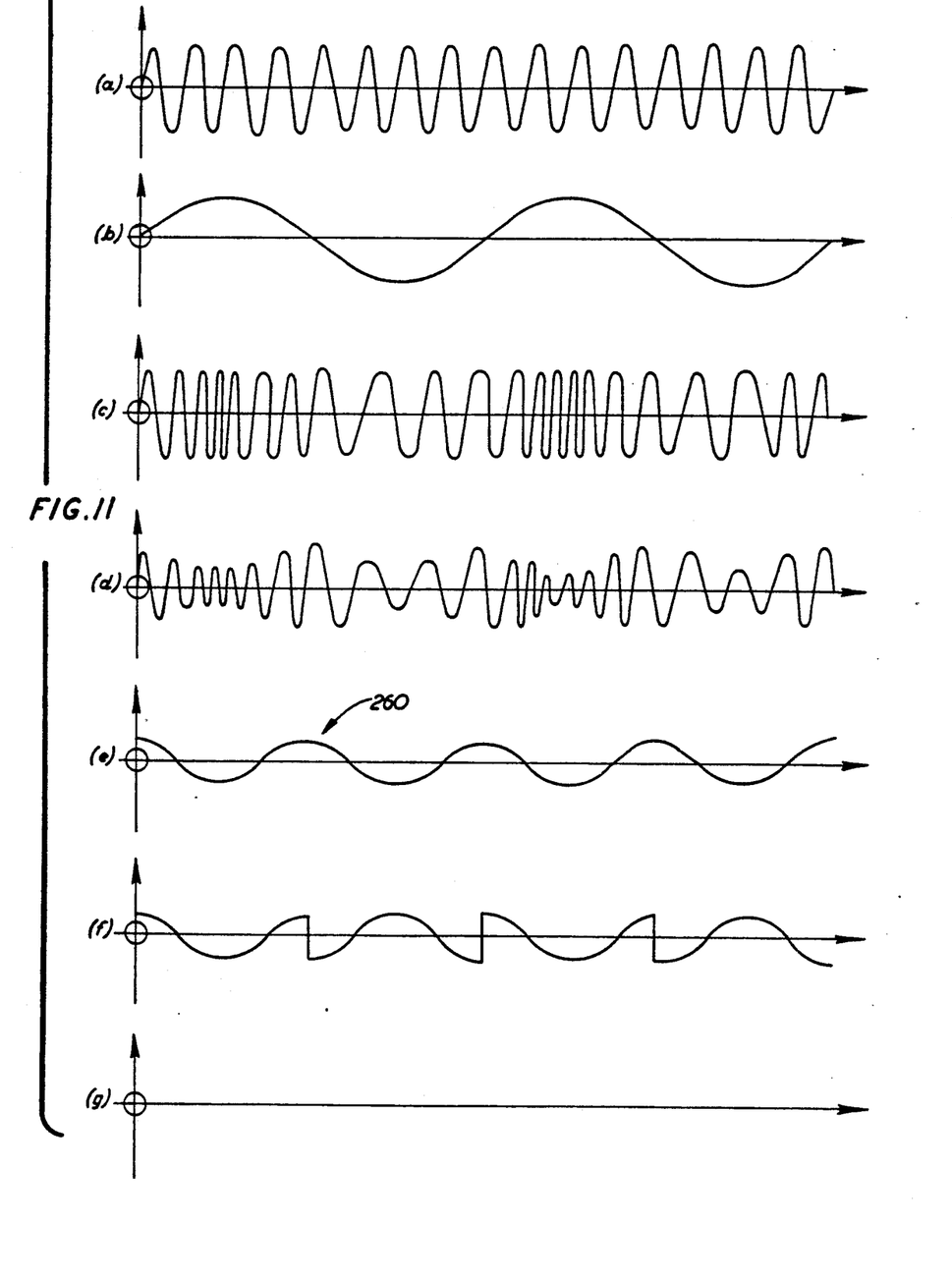
FIG. 11 is an illustration of several waveforms illustrating several of the signals in the circuitry of FIG. 7 after the tuned frequency has been found.

FIG. 11(a) through FIG. 11(g) illustrate the case where the present operating frequency of the fundamental "carrier" intensity modulating frequency corresponds exactly to the center frequency of the frequency transfer characteristic of the optical cavity at its present length. Thus, the envelope detector provides a waveform 260 as illustrated in FIG. 11(e) which has only the second harmonic of the dither frequency out of the envelope detector. The synchronous demodulator provides an error signal which is exactly equal to zero as shown in FIGS. 11(f) and (g).

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. A method, comprising the steps of:
   providing amplitude modulated input light to a passive optical resonator having a variable length dimension for resonating according to the magnitude of the variable length dimension of the resonator in response to a corresponding frequency of amplitude modulated input light;
   detecting output light from the passive optical resonator and providing a detected signal indicative of the intensity thereof;
   determining, in response to the detected signal, the resonant frequency of amplitude modulated input light that produces the maximum intensity within the resonator; and
   relating the determined resonant frequency to the length of the resonator.

2. Apparatus for determining position, comprising:
   a passive optical resonator having a variable length dimension related to the position to be determined, the resonator having a resonant frequency that changes according to the magnitude of the variable length dimension, the resonator having
   an input light port responsive to amplitude modulated input light, the resonator having
   an output light port for providing output light indicative of the intensity of the light within the resonator for determining an input light resonant frequency of amplitude modulation having a wavelength related to the magnitude of the variable length dimension.

3. A passive optical resonator, comprising:
   an optical fiber delay line having an input/output light part end and an insertion end and having an index of refraction matched to the index of refraction of a fluid in
   an enclosure in which the delay line's insertion end is inserted,
   the fiber delay line having a mirrored surface at the input/output light port end thereof, the enclosure having a movable mirror at an end opposite from which the delay line is inserted for reflecting input light back to the mirror at the input/output light port end.

4. The apparatus of claim 3, further comprising:
   means for providing amplitude modulated input light from a light source along
   an optical fiber to the input/output light port end;
   detector means for detecting output light from the input/output light port end along
   another optical fiber to the detector means.

5. The resonator of claim 3, further comprising a variable volume container, wherein the fluid in the enclosure is displaceable into the variable volume container which changes volume according to movement of the movable mirror.

6. Apparatus, comprising:
   a passive optical resonator having a variable length dimension;
   an input light port in the resonator for receiving amplitude modulated input light; and
   an output light port in the resonator for providing output light from the resonator for use in determining the magnitude of the variable length dimension of the resonator by determining the input light frequency of amplitude modulation at which the average intensity of the output light is maximum and relating the wavelength of that maximizing frequency to the magnitude of the variable length dimension.

* * * * *